United States Patent
Lee

(10) Patent No.: US 8,656,532 B2
(45) Date of Patent: Feb. 25, 2014

(54) HAMMOCK STAND WITH WELDED STRUCTURAL SUPPORTS

(76) Inventor: Richard Lee, Clinton, NC (US)

(*) Notice: Subject to any disclaimer, the term of this patent is extended or adjusted under 35 U.S.C. 154(b) by 0 days.

(21) Appl. No.: 13/420,425

(22) Filed: Mar. 14, 2012

(65) Prior Publication Data

US 2012/0233771 A1  Sep. 20, 2012

Related U.S. Application Data

(60) Provisional application No. 61/453,013, filed on Mar. 15, 2011.

(51) Int. Cl.
*A45F 3/22* (2006.01)

(52) U.S. Cl.
USPC .................................. 5/120; 5/124

(58) Field of Classification Search
USPC ............... 5/120, 129, 124–127; 285/188, 68; 219/56, 58; 403/108
See application file for complete search history.

(56) References Cited

U.S. PATENT DOCUMENTS

| | | | |
|---|---|---|---|
| 1,646,974 A | 10/1927 | Moyer | |
| 1,880,909 A | 10/1932 | Dunlap | |
| 2,338,090 A | 1/1944 | Bradfield | |
| 2,532,595 A | 12/1945 | Berger | |
| 2,432,224 A | 12/1947 | Bradfield | |
| 2,468,209 A | 4/1949 | Klein | |
| 2,538,859 A | 1/1951 | Bradfield | |
| 2,560,713 A | 7/1951 | Bender | |
| 4,197,028 A * | 4/1980 | George | 403/208 |
| 6,851,138 B1 * | 2/2005 | Wilson | 5/120 |
| 7,051,917 B2 * | 5/2006 | Simmons | 228/165 |
| 7,082,629 B2 | 8/2006 | Clark | |
| 2005/0262631 A1 | 12/2005 | Clark | |

* cited by examiner

*Primary Examiner* — Fredrick Conley

(57) ABSTRACT

Herein described is a hammock stand of improved strength comprising weight bearing structural members welded together in a manner that improves the strength of certain weight bearing joints within the stand to help avoid collapse and possible injury. Further described herein is a stronger, more durable weld between weight bearing structural members in a hammock stand and the process of producing the weld.

11 Claims, 3 Drawing Sheets

HAMMOCK STAND WITH WELDED STRUCTURAL SUPPORTS

RELATED APPLICATIONS

This application claims priority to U.S. Provisional Patent Application 61/453,013, filed Mar. 15, 2011. The disclosure of U.S. Provisional Patent Application 61/453,013 is incorporated by reference herein in its entirety.

FIELD OF INVENTION

The present invention relates to a weld between weight bearing structural supports of a metal hammock stand for use in hammock stand assembly, a hammock stand assembled using said weld, and processes for making the same.

BACKGROUND OF THE INVENTION

Hammocks are one of the least expensive, oldest, and most convenient of devices for accommodating individuals in a reclining position. Hammocks were initially designed to be attached to and extended between natural supports; however as the technology evolved other supports, such as upright poles and other support structures were used.

It has been noted that certain environments most desirable for hammock use such as beaches and other open areas are devoid of structures for hammock attachment and support. In response self-contained free standing structures for hammock support (e.g. hammock stands) have been developed. Such hammock stands have been produced in a variety of forms, but generally they all include members that are beneath and extend perpendicularly to the axis of the supported hammock. These perpendicular base members are connected to a central base member beneath the hammock and parallel to its axis. Upright stanchions are connected to opposite ends of the central base member and are supported thereby. The upright stanchions extend upwardly from the central base and provide the actual supports between which the hammock is extended.

One problem with hammock stands manufactured of metal is the propensity over time for weld joints between support structures to weaken resulting in catastrophic collapse. Among current steel hammock stand designs made out of cylindrical or tubular supports such as steel pipes, one weld joint has shown to be most prone to weakening and structural failure due to stress: the joint between the central main support and the two perpendicular supports in contact with the ground. Traditionally, this joint has been welded together using standard techniques; however, these techniques alone have not produced a weld joint, and thus a hammock stand, that is sufficiently structurally sound and durable. What is needed is a welding process and resulting weldment that addresses the problems set forth above and produces a stronger and more durable hammock stand.

SUMMARY OF THE INVENTION

Embodiments of the present invention relate to a metal hammock stand with welded structural supports. The present invention may be embodied in a variety of ways.

In one embodiment, the present invention comprises a hammock stand comprising welded metal support structures with stronger, more durable weld joints. In one embodiment of the present invention, one or more of the metal support structures comprise an indention or recess at the weld joint loci between support structures. In another embodiment, the recess at the weld joint loci is between about 8 to about 15 millimeters in depth. In another embodiment, the recess is about 12 millimeters in depth. In yet another embodiment, the weld joint loci comprises a filler material. In an embodiment of the present invention, the filler material is between about 5 to about 12 millimeters in thickness. In another embodiment, the filler material is about 8 millimeters in thickness.

Other embodiments and further details on various aspects of the present invention are set forth in the following description, figures, and claims. It is to be understood that the invention is not limited in its application to the details set forth in the following description, figures, and claims, but is capable of other embodiments and of being practiced or carried out in various ways.

BRIEF DESCRIPTION OF THE FIGURES

The invention is disclosed more in detail with reference to the drawings in which.

DETAILED DESCRIPTION OF THE INVENTION

Further scope and applicability of the present invention will become apparent from the detailed description given herein. However, it should be understood that the detailed description and specific examples, while indicating embodiments of the invention, are given by way of illustration only, since various changes and modifications within the spirit and scope of the invention will become apparent to those skilled in the art.

In accordance with the present invention a stand is provided for supporting a hammock in suspended configuration above the ground. The device of the invention comprises an elongated base member comprising a central member, upwardly extending cantilever members, and one or more support members mounted transverse to the base member to maintain the base member in an upright orientation. The central member is engaged to the cantilever members to form a unitary structure. The engagement of the these respective sections which form the composite structure may consist of any structure including, for example, a tongue and groove joint in which the ends of one section fit within the slots provided in the respective ends of the adjacent section, or spring loaded ball detent assembly, removable bolts, and other fasteners. For example, spring loaded detent mechanisms, base member or cantilever members, depending on the orientation, may comprise a plurality of spring-loaded ball detents disposed in a wall. Additionally base member or cantilever members may have associated holes formed therein such that when the members are properly mounted onto the connector assemblies the detent balls are in registry with the holes, thereby releasably locking the members onto the connector assembly and preventing rotational and lateral slippage of the members. It will be appreciated that once the engagement between central member and cantilever members is made the members may also be permanently secured by means of adhesive or other fasteners.

Thus, the entire base member between whose ends the hammock is suspended consists of a composite three section member whose sections are securely joined in interlocking arrangement. Added stability and strength are provided by having transverse support members engage the composite member at approximately points where the respective sections are joined together and in the manner described herein.

Figure 1:
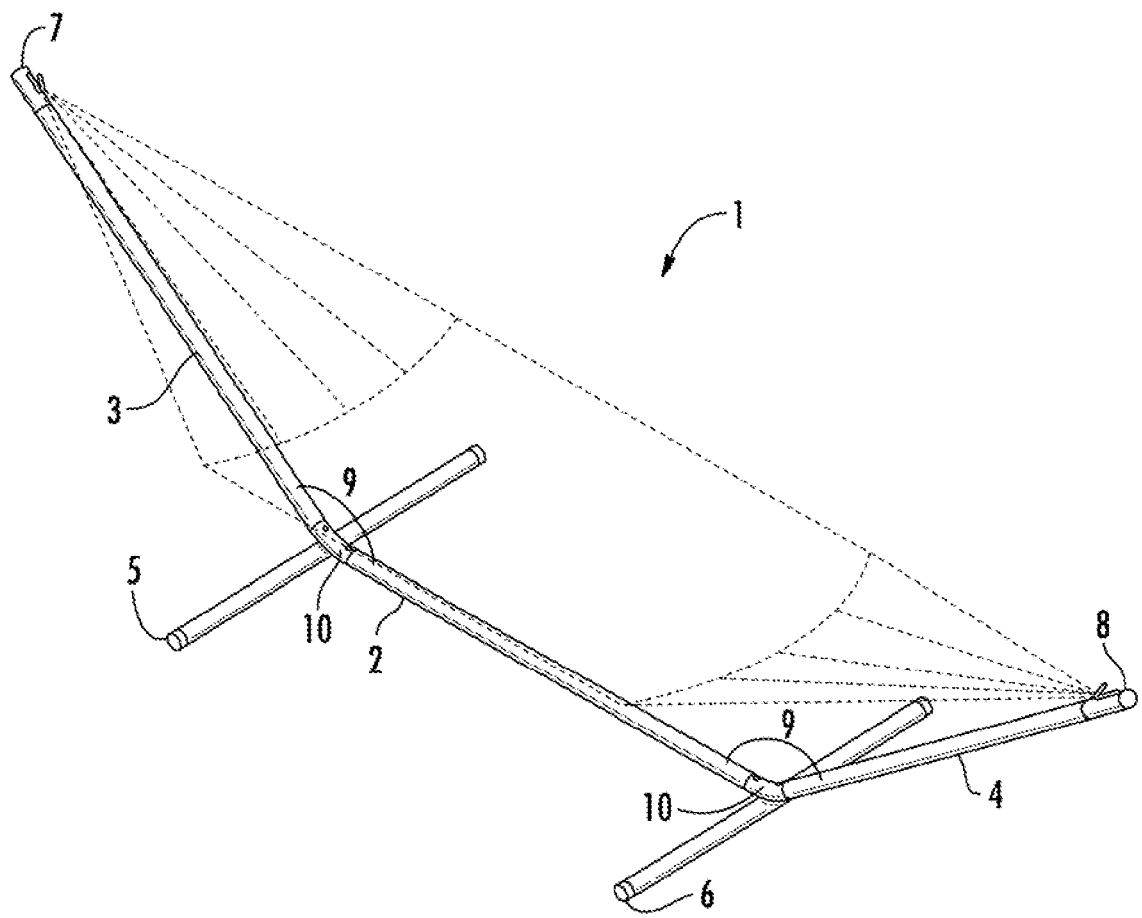
FIG. 1 shows a side view of a full metal hammock stand.

Reference is made to FIG. 1, which illustrates an embodiment of an assembled hammock stand illustrated in an upright configuration. The hammock stand comprises a base member 1, having a central member 2 and two cantilever members 3 and 4 engaged to and at opposite ends of the central member 2. Transverse support members are shown at 5 and 6 for maintaining the device in a stable upright configuration suitable for suspending a hammock so that it swings freely above the ground. Although, not specifically illustrated in FIG. 1 of the drawings, the ends 7 and 8 of cantilever members 5 and 6 are provided with a means for attaching the ends of the hammock or flexible connectors attached to the ends of the hammock such as ropes or chains.

The cantilever members 3 and 4 are at equal obtuse angles in relation to central member 2. In one embodiment, the angle 9 between cantilever members 3 and 4 and central member 2 is between about 120 and 150 degrees. In another embodiment, the angle 9 between these members is between about 130 and 140 degrees, and in another embodiment the angle is 135 degrees.

Located beneath the angle vertex 10 between the cantilever members 3 and 4 and the central member 2 of the base member 1 are two support members 5 and 6. The support members 5 and 6 are in direct contact with the base member 1 at or near the respective obtuse angle vertices. The support members 5 and 6 are preferably positioned at a 90 degree angle to the base member 1.

As shown in the embodiment illustrated in FIG. 1 base member 1 and support members 5 and 6 are tubular structures or pipes. For the purposes of the present invention, the tubes may be identical in diameter and wall thickness or may differ in diameter and wall thickness. In one embodiment, the base member 1 is 42 millimeters in diameter and 3.5 millimeters in wall thickness. In the same embodiment, the transverse support members 5 and 6 are 48 millimeters in diameter and 2 millimeters in wall thickness. It should be recognized by one of ordinary skill in the art that the diameter and wall thickness of the aforementioned support structures is important to the strength and durability of the hammock stand. It should also be recognized that the diameter and wall thickness of the tubular support structures influences the depth of the recess 11 and the thickness or volume of filler material 12 needed for the purposes of producing a strong and durable weldment as described herein.

Figure 3:
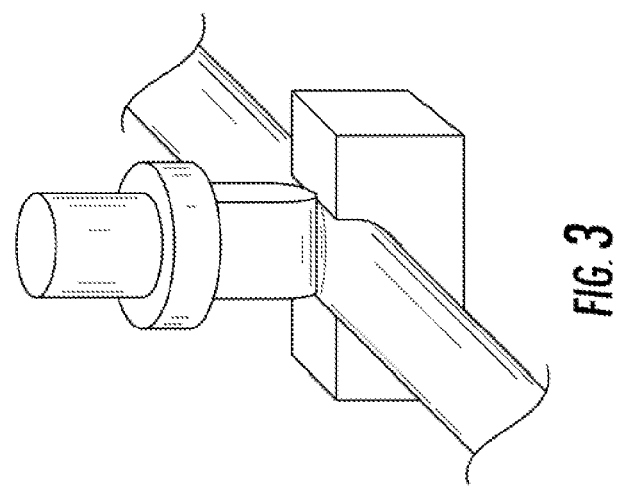
Figure 2:
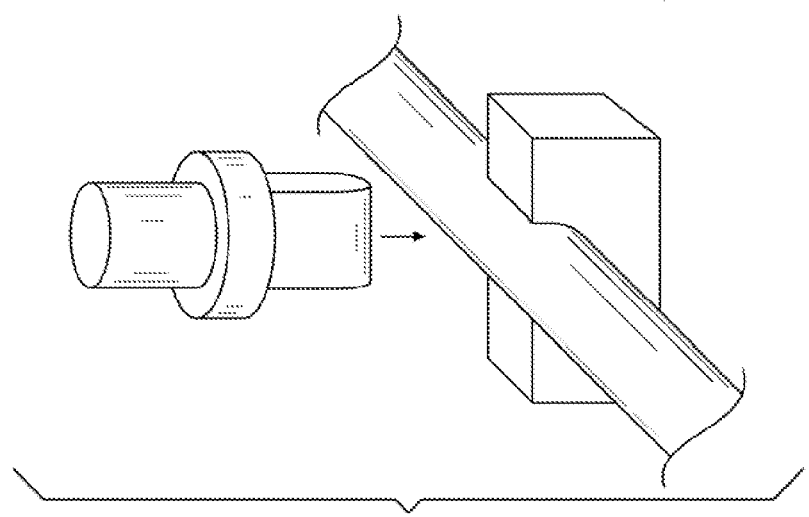

In the embodiment illustrated in FIGS. 1-3, the base member 1 and transverse support members 5 and 6 are made of round steel tubing. The steel tubing may comprise various surface conditions, for example, the tubing surface may be hot rolled, hot rolled pickled and oiled, cold rolled, zinc flo-coated, galvanized, or aluminized. It should be noted that the base member 1 and transverse support members 5 and 6 may be made of other weldable materials including cast iron, carbon steel and low-alloy steel, stainless steel, aluminum, copper and copper alloys, nickel and nickel alloys, titanium.

Figure 6:
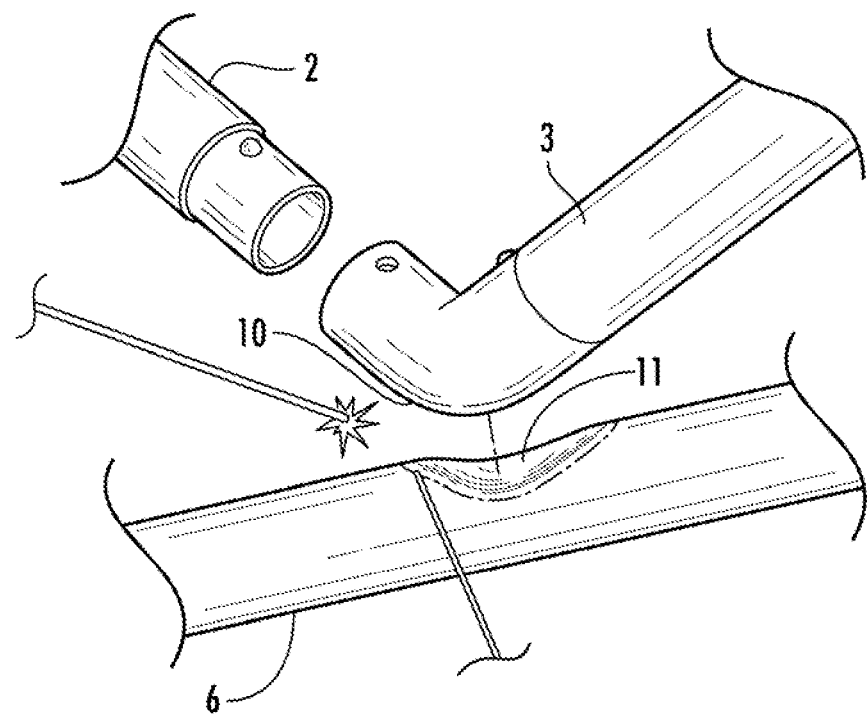
FIG. 6 shows the base member positioned above the transverse support member in preparation for welding and the introduction of filler material.

The point of contact between the support members 5 and 6 and the base member 1 is traditionally recognized as an area of significant structural weakness in a hammock stand such as the one shown in FIG. 1 and it is this inherent weakness that the invention described herein is intended to ameliorate. FIG. 6 illustrates a close up of one such point of contact or joint between a support member 5 and the base member 1.

Figure 4:
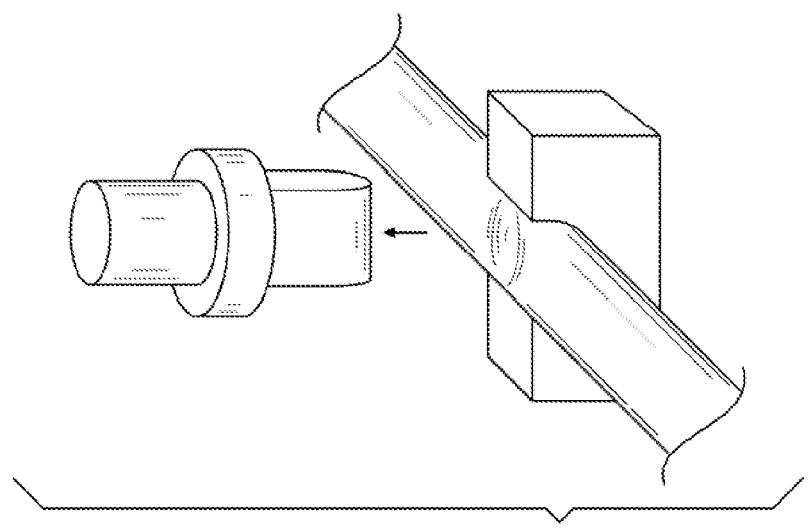
FIGS. 2-4 show how the recess in the tubular support structures is generated using a stamping device.

Referring now to FIGS. 4 and 6, an indentation or recess 11 is illustrated on the surface of either support member 5 as a weld joint loci between the two members. For the purposes of this invention, the recess may be created using any number of available methods mechanistic and/or manual. For example, as depicted in FIGS. 2-4, the recess 11 may be punched with a stamping tool. Alternatively the recess 11 could be made manually or by hand tool, such as a ball peen hammer. The recess 11 of the present invention must be of the proper dimension to produce a weld joint that is strong and durable. Through trial and error it has been determined that the desired strength and durability is obtained when the depth of the recess 11 is within a certain range. In one embodiment, the recess is between about 8 to about 15 millimeters in depth at its deepest point as measured from the outer, unmolested, normal surface of support member 5. In yet another embodiment, the recess is about 12 millimeters in depth. In one embodiment, the recess is an oval shape and gradually tapers from the indention's outer perimeter or rim toward the center or core of recess 11, the center or core of the recess 11 representing the deepest point of the recess 11. It should be noted that the depth of the recess 11 and the filler material deposited within the void between base member 1 and support members 5 and 6 at the recess 11 is essential to improvement of strength between these structures.

Figure 5:
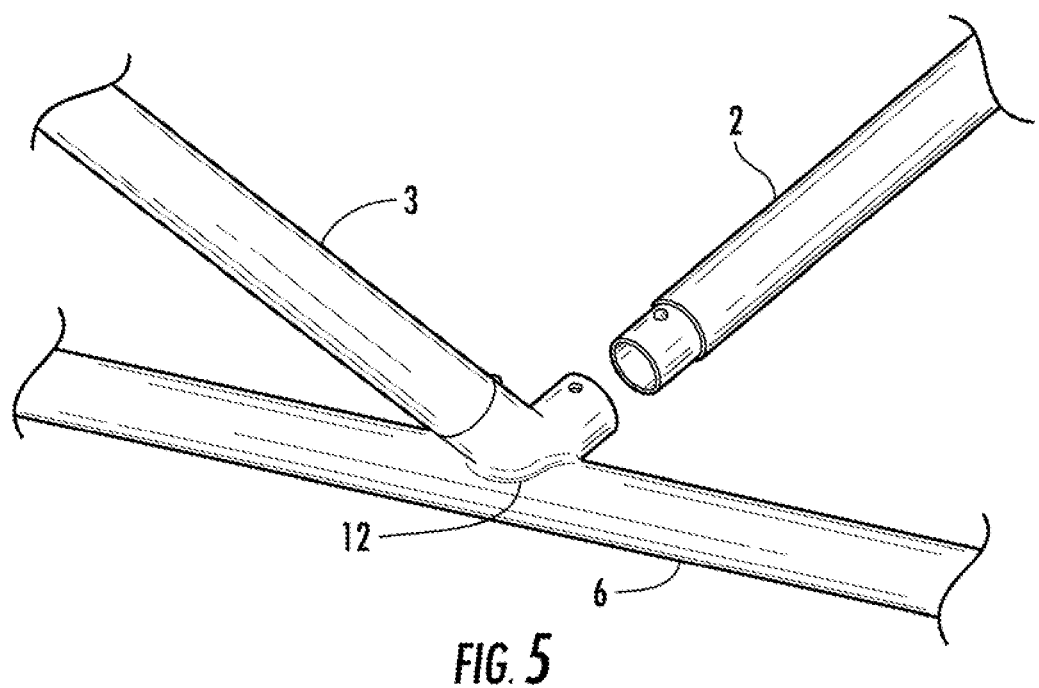
FIG. 5 shows a weldment of the present invention wherein the base member is welded to the transverse support member.

As illustrated in FIGS. 5 and 6, once the recess 11 is generated, the base member 1 and support members 5 and 6 are welded together at the weld joint loci using appropriate welding technology and techniques known to those of ordinary skill in the art. Once again, recess 11 serves as the weld joint loci wherein a suitable weld bond is generated. Any known and available welding processes and procedures may be used as long as the procedure generates a weldment of suitable strength for the purposes of the present invention. Exemplary welding technologies include, gas welding, arc welding, metal inert gas (MIG) welding, tungsten inert gas (TIG), shielded metal arc welding (SMAW), submerged arc welding (SAW), chord welding, slot and plug welding, and the like. In one embodiment, MIG welding is employed.

It should be noted that the structural components of the hammock stand including the central member 2, cantilever members 3 and 4, and support members 5 and 6, may be made of any material strong enough to support the user's weight and capable of being welded together as explained herein. For example, in one embodiment the members are fabricated from galvanized steel to hinder rust formation.

It will be recognized to those of ordinary skill in the art that welding systems may generally include an electrode configured to pass an arc between a torch and a work piece, thereby heating the work piece to create a weld. In many systems, such as metal inert gas (MIG) welding and stick welding systems, the electrode is a consumable wire that melts into the weld to provide a filler material into the weld. In other words, a single wire serves both as an electrode and as the filler material. In contrast, tungsten inert gas (TIG) welding systems employ a non-consumable tungsten electrode that is independent from the filler material. In other words, the TIG welding process does not melt the tungsten electrode into the weld forming on the work piece. Instead, a user generally holds the TIG torch with the tungsten electrode in one hand, while the user simultaneously and independently holds the filler material in another hand.

Depending on the welding system employed, the system used may furthermore include a power source, a shielding gas source, a cooling system, and a torch. The power source provides power to the welding torch via a supply conduit. The power source may supply a direct current (DC) or alternating current (AC) to the torch depending on the desired application. For example, an AC current may be suited for welding aluminum or magnesium, and a DC current may be suited for welding stainless steels, nickel or titanium. In addition to matching the current to the material selection, the output of the power source may be varied to obtain the desired weld characteristics. For example, a low AC frequency (e.g., 60 Hz) current may generated a wide arc with shallow penetration of a work piece, while a high AC frequency (e.g., 200 Hz) current may generate a focused arc with deeper penetration into the work piece.

In addition to the frequency of the current, the power source may vary the amperage of the current output to the torch. The setting for the amperage output by the power source may be adjusted by a setting a knob or button on the power source, or may be set by a remote control. For example, a welding system may include a foot pedal remote control that allows the operator to make current adjustments during welding by either holding down the foot pedal or feathering the foot pedal remote control to vary amperage. The remote control may also include a finger tip control audible command, or other form of input to signal the power source to output a corresponding current.

In addition, the torch may be supplied with a shielding gas from a supply. In general, the shielding gas may be supplied to the torch and expelled from the torch at the location of the weld. The shielding gas may be expelled immediately prior to striking the welding arc, through welding, and/or until shortly after the welding arc, throughout the welding, and/or until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and may help to start and maintain a stable arc.

The shielding gas may be provided in a container and delivered to the torch via a regulator, a conduit, a gas valve, and the supply conduit. The regulator may allow an operator to limit the pressure of the gas delivered to the gas valve to obtain a desired flow rate. Further, the gas valve may provide for stopping and starting the flow of the shielding gas to the torch in coordination with other welding operations.

The welding system may be provided with a cooling system to reduce heat build-up. The cooling system may take various forms including gas cooled and liquid cooled systems. The cooling systems may provide for circulation of the coolant via coolant supply conduits and coolant return conduit. The cooling system may be powered from the power supply via a coolant system power cord.

Upon creation of the recess 11, base member 1 and support member 5 and 6 are transversely positioned to be affixed to one another through weld and the addition of filler material. The filler material 12, a metal that fills a gap of a weld joint and binds the base member 1 to support members 5 and 6 together in the present invention will depend largely on the base material that is welded together. Selection is based on the composition of the metal being welded, the process variation being used, joint design and the material surface conditions. Filler material selection greatly influences the mechanical properties of the weld and is a factor of weld quality. In general the finished weld metal should have mechanical properties similar to those of the base material with no defects such as discontinuities, entrained contaminants or porosity within the weld. Examples of appropriate filler materials for the purpose of the present invention are aluminum, steel, and stainless steel. In one embodiment of the present invention, the filler material comprises steel.

The filler material 12 of the present invention is deposited within the weld joint to a desired thickness. The filler material 12 may be supplied from a filler wire that is melted and deposited in the recess 11 until the void is filled. The weld deposits may be laid down in a side-by-side manner in the void and/or stacked one atop the other in the void, or made in any manner to fill the void. It should be noted, however, that the thickness or width of the deposited filler material 12 within the weld joint is important to the strength and durability of the weldment and to the hammock stand itself. Through trial and error it has been determined that the desired strength and durability is obtained within a range of filler material 12 thickness. In one embodiment the thickness of the filler material 12 deposited into the recess 11 between base member 1 and support members 5 and 6 is between about 5 millimeters to about 11 millimeters. In another embodiment, the filler material 12 thickness is about 8 millimeters.

It will be further apparent to those skilled in the art that various modifications and variations can be made in the device of the present invention without departing from the spirit or scope of the invention. Thus it is intended that the present invention cover the modifications and variations of this invention provided they come within the scope of the appended claims and their equivalents.

What is claimed is:

1. A hammock stand of improved strength comprising a base member comprising a horizontally oriented central portion and two end portions extending upward at obtuse angles in relation to the central portion forming an elbow structure between the central portion and the two end portions, a plurality of transverse support members each comprising a first end, second end, and an upper and lower face, an indentation with a concavity centrally located between said first end and said second end of transverse support members and formed in said upper face of the transverse support member, and weld filler material deposited between said base member and transverse support member at the interface between the elbow structure and the indentation.

2. The hammock stand in claim 1 wherein the indentation on said transverse support members is between about 8 to about 15 millimeters maximum depth.

3. The hammock stand in claim 1 wherein said filler material is between about 5 to about 12 millimeters in maximum thickness.

4. The hammock stand in claim 1 wherein the indentation on said transverse support members is about 12 millimeters maximum depth.

5. The hammock stand in claim 1 wherein said filler material is about 8 millimeters in maximum thickness.

6. A method of forming a hammock stand of improved strength comprising the steps of providing a base member comprising a horizontally oriented central portion and two end portions extending upward at obtuse angles in relation to the central portion forming an elbow structure between the central portion and the two end portions, providing a plurality of transverse support members each comprising a first end, second end, and an upper and lower face; forming an indentation with a concavity centrally located between said first end and said second end of transverse support members and formed in said upper face of the transverse support member, and depositing weld filler material between said base member and transverse support member at the interface between the elbow structure and the indentation.

7. The method of claim 6 wherein said indentation is between about 8 and 15 millimeters in depth.

8. The method of claim 6 wherein said indentation is about 12 millimeters in depth.

9. The method of claim 6 wherein said tiller material is between about 5 and 12 millimeters in thickness.

10. The method of claim 6 wherein said filler material is about 8 millimeters in thickness.

11. The method of claim 6 wherein said indentation is formed with a stamping tool.

* * * * *